Figure 1:
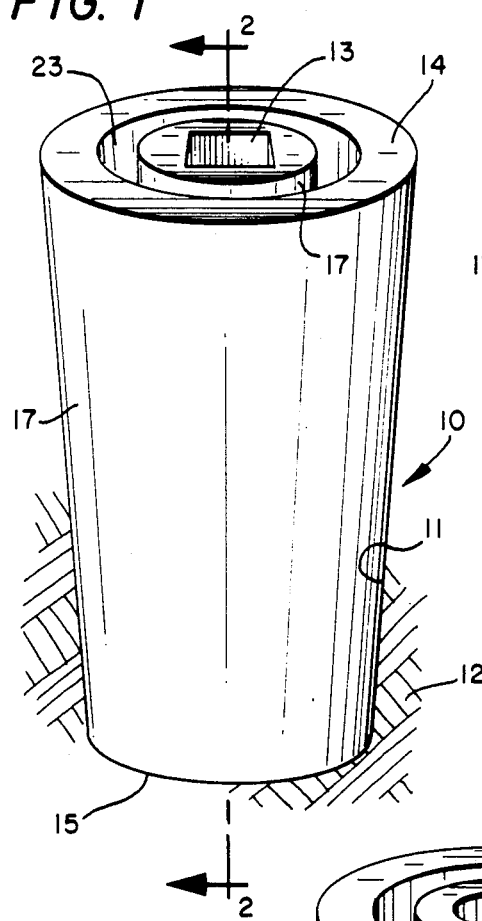

United States Patent [19]

Peterson

[11] Patent Number: 4,671,413

[45] Date of Patent: Jun. 9, 1987

[54] PRE-MEASURED DRY MIX CEMENT ENCLOSED BY WATER SOLUBLE MATERIAL WITH WATER RESERVOIR

[76] Inventor: John R. Peterson, 3827 Towsend Dr., Dallas, Tex. 75229

[21] Appl. No.: 747,950

[22] Filed: Jun. 24, 1985

[51] Int. Cl.⁴ .......................................... B65B 85/46
[52] U.S. Cl. ........................... 206/527; 52/173 R; 52/297; 206/321; 249/51; 249/61; 264/31; 405/233
[58] Field of Search ............... 249/1, 51, 61, DIG. 2; 405/222, 233, 261; 264/31, 240; 206/321, 322, 527; 52/297, 309.17, 173 R

[56] References Cited

U.S. PATENT DOCUMENTS

| Re. 25,869 | 10/1965 | Schuermann et al. | 52/309.17 |
|---|---|---|---|
| 3,166,871 | 1/1965 | Simison | 206/321 |
| 3,922,832 | 12/1975 | Dicker | 52/173 |
| 4,096,944 | 6/1978 | Simpson | 405/233 |
| 4,126,005 | 11/1978 | Coursen | 405/261 |

Primary Examiner—Jay H. Woo
Assistant Examiner—James C. Housel
Attorney, Agent, or Firm—Warren H. Kintzinger

[57] ABSTRACT

A pre-measured amount of dry mix cement that is enclosed in water soluble material and shaped with a water reservoir is placed in a ground hole sized to the form it is receiving. It is in conical or cylindrical form with a center square or round hole receiving a square or round post or pole and is placed in the ground and the post or pole is inserted in the center hole. The water reservoir is of such volume that when it is filled the proper amount of water is provided for the amount of dry mix cement in the form. Then with dissolving of the water soluble material the cement and water may be mixed and stirred in place around the post or pole manually with a mixing rod. With drilling through a floor and into earth beneath the floor a similar product is used with the dry mix cement encased in water soluble material and shaped with a water reservoir. The form is placed in the hole and the reservoir is filled with water and then mixed with dissolving of the water soluble material. Then a mounting flange or foundation stud can be easily pushed into the cement which can be accomplished easily with the relatively small cross-sectional area of the J-bolt. The dry mix cement water soluble material encased forms as products may be each enclosed in a plastic bag provided with a convenience carrying handle to protect it in the store and while being transported from water contact.

17 Claims, 4 Drawing Figures

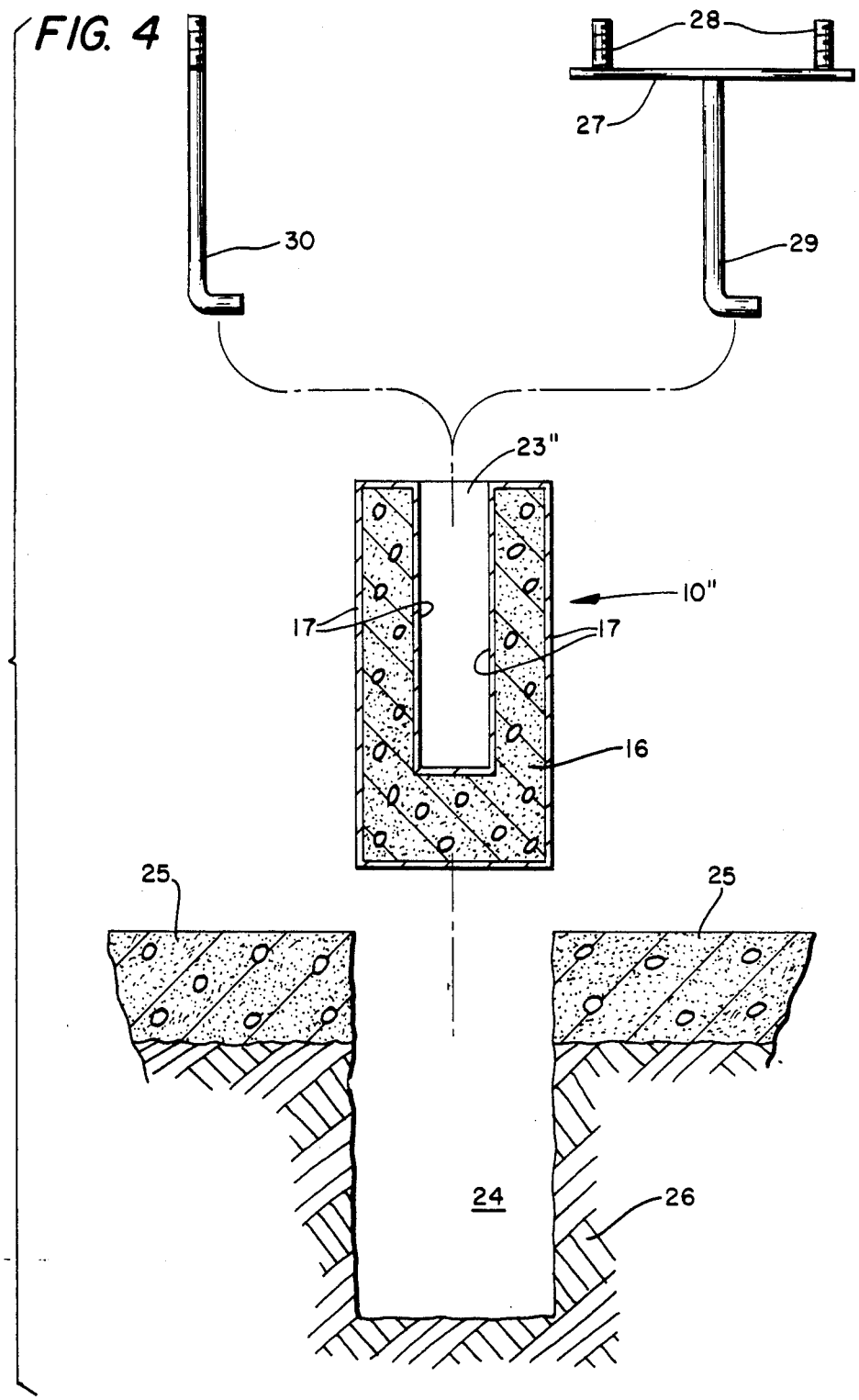

PRE-MEASURED DRY MIX CEMENT ENCLOSED BY WATER SOLUBLE MATERIAL WITH WATER RESERVOIR

This invention relates in general to the preparation of in the hole cement anchor forms for posts and poles and for mount pads and/or J bolts, and more particularly, to pre-measured dry mix cement enclosed in pre-molded forms enclosed by water soluble material and formed with water reservoirs.

Heretofore whenever post hole concrete and cement anchors and in the hole supports for mount pads or foundation studs are needed holes are dug, cement or concrete mixed with water and then poured into the hole to cure. Since it is important to have enough mixed cement or concrete for the job most people mix more than needed rather than preparing the exact amount required for a specific job. This is not only time consuming, requiring mixing tools and containers but also requiring clean up and suitable disposal of extra not used cement mix. Another problem is in the use of proper portions of water to cement in order to optimize cured cement and concrete strength.

It is, therefore, a principal object of this invention to provide a pre-measured dry mix cement form shaped and enclosed by water soluble material for insertion into holes sized and shaped to receive the form.

Another object is to provide such pre-measured dry mix cement forms with openings sized such that when filled the proper amount of water is provided for the dry mix cement in the form.

Still another object is to provide such a pre-measured dry mix cement form that is mixed with the water added in place in the hole.

A further object is to provide such a pre-measured dry mix cement form as a product enclosed in a plastic bag as a protection from undesired water contact contaminant in the store and while being stored and transported.

Features of the invention useful in accomplishing the above objects include, in pre-measured dry mix cement soluble material enclosed pre-molded forms, a product provided sized and shaped to fit holes dug or drilled therefore. Each pre-molded form is provided with a cavity for receiving water at the time the cement is to be mixed with the cavity sized to hold when filled an appropriate amount of water for the quantity of dry mix cement encased in the form. It is in conical or cylindrical form with a center square or round hold receiving a square or round post or pole and is placed in the ground and the post or pole is inserted in the center hole. Then with dissolving of the water soluble material the cement and water may be mixed and stirred in place around the post or pole manually with a mixing rod. With drilling through a floor and into earth beneath the floor a similar product is used with the dry mix cement encased in water soluble material and shaped with a water reservoir. The form is placed in the ground hole and the reservoir is filled with water and then mixed with dissolving of the water soluble material. Then a mounting flange or foundation stud can be pushed easily into the cement which can be accomplished easily with the relatively small cross-sectional area of the J-bolt. The dry mix cement water soluble material encased forms as products may each be enclosed in a plastic bag provided with a convenience carrying handle to protect it in the store and while being transported from water contact.

Figure 2:
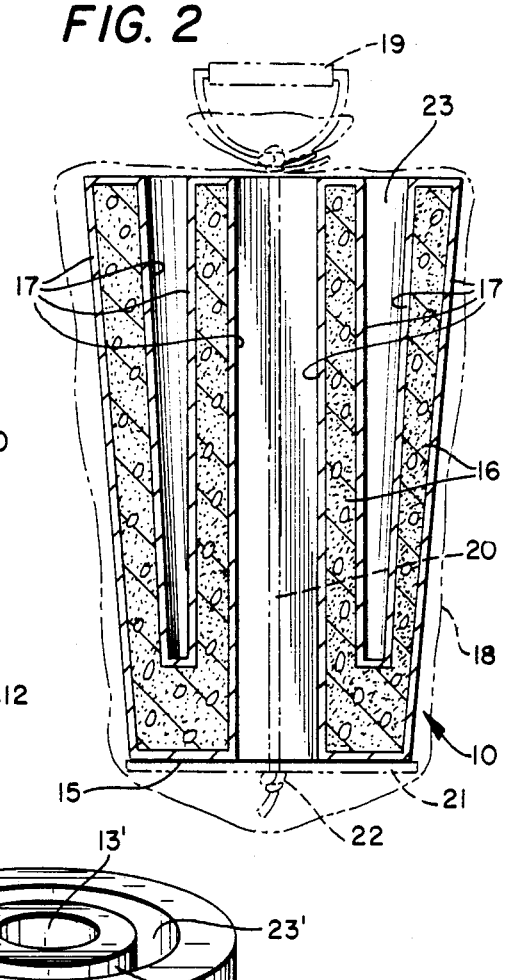
Figure 3:
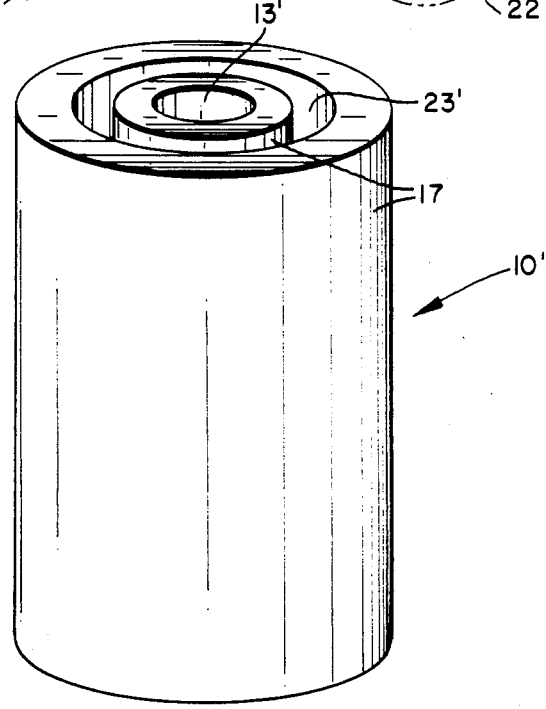

Specific embodiments representing what are presently regarded as the best modes of carrying out the invention are illustrated in the accompanying drawings:

In the drawings:

FIG. 1 represents a perspective view of a conically shaped pre-measured dry mix cement soluble material enclosed pre-molded form in place in a ground hole prior to post insertion and water filling the reservoir for cement mixing;

FIG. 2, a cut away and sectioned view taken along line 2—2 of FIG. 1 showing internal detail of the form of FIG. 1 and the form as enclosed in a plastic waterproof bag equipped with a carrying handle shown in phantom;

FIG. 3, a perspective view like that of FIG. 1 but of a cylindrically shaped pre-measured dry mix cement soluble material enclosed pre-molded form; and FIG. 4, an exploded view partially in section showing a cylindrically shaped pre-measured dry mix cement soluble material enclosed pre-molded form with a ceter water receiving reservoir cavity, a core drilled hole through a floor sized to receive the form, and a mounting flange with a J-bolt and an individual J-bolt either of which are placeable in the mixed cement in the floor and ground hole after mixing and before cure setting of the mixed cement.

Referring to the drawings:

The conically shaped pre-measured raw cement soluble material enclosed pre-molded form 10 of FIGS. 1 and 2 is placeable in a ground hole 11 sized and shaped therefore in earth 12. Form 10 is provided with a center square opening 13 that extends from the top 14 to the bottom 15 thereof sized to receive the bottom of a square post (not shown). The form 10 includes dry mix cement 16 enclosed in a water soluble material casing 17 such as paper mache or a water dissolvable polymer material. The pre-measured dry mix cement soluble material enclosed pre-molded form 10 may be enclosed in a plastic waterproof bag 18 and equipped with a carrying handle 19 with a rope 20, indicated in phantom, extended through the square opening 13 to a support plate 21 at the bottom. The bag 18 protects the form 10 product in the store, while being transported and while in storage, and the handle 19, rope 20 and support plate 21 are a convenience for the person carrying the product. When the product form 10 is on location for use the bag 18 is removed and then the knot 22 at the bottom of rope 20 below support plate 21 untied or the rope 20 cut for removal of the handle 19 the rope 20 and support plate 21 generally before the form is placed in the ground hole 11. The form 10 is provided with an annular molded reservoir opening 23 that is sized as a reservoir to hold an appropriate amount of water when filled for the volume of dry mix cement 16 in the form 10. When water is poured into the reservoir opening 23 it should be filled with one pouring to completion thereof before the water soluble material casing 17 dissolves. Thereafter as the casing 17 becomes dissolved the water and cement 16 may be manually mixed by any convenient stirring tool with the post held in place having been previously inserted in opening 13.

Referring now to the cylindrically shaped pre-measured dry mix cement soluble material enclosed pre-molded form 10' of FIG. 3 this form has basically the same features as form 10 of FIGS. 1 and 2 with, however, the form 10' being a cylinder instead of a truncated cone. The opening 13' is a cylindrical through top to bottom openings and the reservoir opening 23' is a cylindrical opening. The cement 16 is the same and the water soluble coating 17 is the same. Obviously, form 10'0 could be provided with a square opening as with the embodiment of FIG. 1 and the form 10 of FIG. 1 in the like manner could be provided with a circular opening for a round post instead of a rectangular post.

With the cylindrical pre-measured dry mix cement soluble material enclosed pre-molded form product 10" of FIG. 4 the form is provided with a center water receiving reservoir cavity 23". The cylindrical form 10" is placeable in a core drilled hole 24 through a concrete floor 25 and on into the earth 26 beneath the floor 25. The water reservoir 23" is filled with water thereby insuring appropriate water to dry mix cement 16 mix and then the water and cement manually mix stirred as the water soluble coating 16 is disintegrated or dissolved from the walls of the water reservoir 23". Thereafter before cure setting of the mixed cement 16 a foundation plate 27 with foundation studs 28 may be placed in position with the J-bolt bottom extension 29 pushed down into the mixed cement, or a straight J-bolt 30 may be pushed down into the setting cement. The relatively small cross-sectional area of the J-bolts 29 and 30 facilitates their easy submergence in the cement such as not the case with large posts which must be held in place in the forms such as is provided for with the embodiments of FIGS. 1–3.

It should be noted that for the purposes of this application that the term soluble material be extended to include materials such as paper mache where when exposed to water it softens and easily dissociates into clumps and individual fibers particularly with mix stirring thereof.

Whereas this invention is herein illustrated and described with respect to several specific embodiments thereof, it should be realized that various changes may be made without departing from the essential contributions to the art made by the teachings thereof.

I claim:

1. A dry mix cement molded form placeable in a hole sized to the form consisting of: a pre-measured amount of dry mix cement; a coating of water soluble material with said dry mix cement encased in said coating of water soluble material molded into a form for insertion in a hole; and with said molded form including a water reservoir opening extending from the top of said molded form down into the form, lined with said water soluble material and sized to contain an appropriate amount of water for the amount of dry mix cement in the molded form for cure setting of the cement after mixing of the water and cement upon dissolution of said water soluble material.

2. The dry mix cement molded form of claim 1, wherein said water soluble material is paper mache.

3. The dry mix cement molded form of claim 1, wherein said water soluble material is water dissolvable polymer material.

4. The dry mix cement molded form of claim 1, wherein said molded form as a product is enclosed in a water proof bag to protect it during storage and while being transported from water contact.

5. The dry mix cement molded form of claim 4, wherein said molded form is provided with a top to bottom through opening into which the bottom of a post or pole to be supported by a cement anchor is inserted after the molded form is placed in said hole and before the cement and water are stir mixed.

6. The dry mix cement molded form of claim 1, wherein said molded form is provided with a top to bottom through opening into which the bottom of a post of pole to be supported by a cement anchor is inserted after the molded form is placed in said hole and before the cement and water are stir mixed.

7. The dry mix cement molded form of claim 6, wherein said water reservoir opening is annular and spaced from and around said top to bottom through opening.

8. The dry mix cement molded form of claim 7, wherein said water reservoir opening said top to bottom through opening are concentric.

9. The dry mix cement molded form of claim 7, wherein said top to bottom through opening is cylindrical.

10. The dry mix cement molded form of claim 7, wherein said top to bottom through opening is square.

11. The dry mix cement molded form of claim 7, wherein said molded form is in the shape of a turncated cone.

12. The dry mix cement molded form of claim 7, wherein said molded forms is in the shape of a cylinder.

13. The dry mix cement molded form of claim 1, wherein said water reservoir opening is a center cavity extending from the top of said molded form down into the form with the side wall and bottom thereof lined with said water soluble material.

14. The dry mix cement molded form of claim 13, wherein the volume of water and cement when mixed for set curing is correct that along with the volume of the portion of an article anchored in cement results in the cement being the proper amount for the hole sized therefore.

15. A dry mix cement molded form placeable in a hole sized to the form comprising: a pre-measured amount of dry mix cement; a coating of water soluble material with said dry mix cement encased in said coating of water soluble material molded into a form for insertion in a hole; and with said molded form including a water reservoir opening from the top of said molded form down into the form, lined with said water soluble material and sized to contain an appropriate amount of water for the amount of dry mix cement in the molded form for cure setting of the cement after mixing of of the water and cement upon dissolution of said water soluble material; wherein said molded form as a product is enclosed in a water proof bag to protect it during storage and while being transported from water contact; said molded form is provided with a top to bottom through opening into which the bottom of a post or pole to be supported by a cement anchor is inserted after the molded form is placed in said hole and before the cement and water are stir mixed; and wherein said molded form is also provided with a convenience handle fastened by a rope extended through said top to bottom through opening to a support plate at the bottom of said molded form.

16. The dry mix cement molded form of claim 15, wherein said water reservoir opening is annular and spaced from and around said top to bottom through opening.

17. The dry mix cement molded form of claim 16, wherein the volume of water and cement when mixed for set curing along with the volume of the portion of an article anchored in cement results in the cement being the proper amount for the hole sized therefore.

* * * * *